United States Patent
Chen et al.

(10) Patent No.: US 9,615,071 B2
(45) Date of Patent: Apr. 4, 2017

(54) METHOD AND APPARATUS FOR TUNING CAMERA CORRECTION SETTING FOR CAMERA MODULE

(71) Applicant: MEDIATEK INC., Hsin-Chu (TW)

(72) Inventors: Chia-Ching Chen, Hsinchu (TW); Muge Wang, San Jose, CA (US); Chih-Ping Lin, Hsinchu (TW); Chia-Hui Kuo, Hsinchu County (TW); Yu-Seng Tsai, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 326 days.

(21) Appl. No.: 14/300,247

(22) Filed: Jun. 10, 2014

(65) Prior Publication Data

US 2015/0036018 A1   Feb. 5, 2015

Related U.S. Application Data

(60) Provisional application No. 61/861,053, filed on Aug. 1, 2013.

(51) Int. Cl.
*H04N 9/73* (2006.01)
*H04N 1/60* (2006.01)

(52) U.S. Cl.
CPC ............ *H04N 9/735* (2013.01); *H04N 1/603* (2013.01); *H04N 1/6027* (2013.01); *H04N 1/6086* (2013.01)

(58) Field of Classification Search
CPC ............... H04N 5/225; H04N 2101/00; H04N 2201/0084; H04N 2209/04; H04N 3/15;
(Continued)

(56) References Cited

U.S. PATENT DOCUMENTS

2008/0074515 A1* 3/2008 Takane .................. H04N 5/3572
348/251
2009/0141175 A1* 6/2009 Hsu ......................... H04N 9/735
348/657
(Continued)

FOREIGN PATENT DOCUMENTS

CN          1372418 A      10/2002
CN        101472188 A       7/2009
(Continued)

*Primary Examiner* — Mekonnen Dagnew
(74) *Attorney, Agent, or Firm* — Winston Hsu; Scott Margo (57) ABSTRACT

A camera tuning circuit has a first storage space, a second storage space and a controller. The first storage space stores a first reference camera correction setting for a reference camera module under a first color temperature. The second storage space stores a second reference camera correction setting for the reference camera module under a second color temperature, wherein the second color temperature is different from the first color temperature. The controller receives a default camera correction setting of a target camera module, the first reference camera correction setting, and the second reference camera correction setting, and generates a tuned camera correction setting for the target camera module according to the default camera correction setting, the first reference camera correction setting, and the second reference camera correction setting.

16 Claims, 4 Drawing Sheets

(58) Field of Classification Search
CPC .......... H04N 5/232; H04N 9/04; H04N 9/735;
G03B 19/00; G03B 19/18; G03B
2219/00; G03B 2219/02; Y10S 358/9091;
G06F 17/30244; G06F 17/30781; G06F
17/30858
See application file for complete search history.

(56) References Cited

U.S. PATENT DOCUMENTS

| | | |
|---|---|---|
| 2011/0279703 A1 | 11/2011 | Lee |
| 2012/0050565 A1 | 3/2012 | Imai |
| 2013/0308006 A1* | 11/2013 | Finnila ............... H04N 5/23225 348/222.1 |

FOREIGN PATENT DOCUMENTS

| | | |
|---|---|---|
| CN | 102346356 A | 2/2012 |
| CN | 102685389 A | 9/2012 |

* cited by examiner

METHOD AND APPARATUS FOR TUNING CAMERA CORRECTION SETTING FOR CAMERA MODULE

CROSS REFERENCE TO RELATED APPLICATIONS

This application claims the benefit of U.S. provisional application No. 61/861,053, filed on Aug. 1, 2013 and incorporated herein by reference.

BACKGROUND

1. Field of the Invention

The disclosed embodiments of the present invention relate to camera correction, and more particularly, to method and apparatus for tuning a camera correction setting (e.g., a shading correction setting or a white balance correction setting) for a camera module under a designated color temperature.

2. Description of the Prior Art

An electronic device (e.g., a mobile phone) may be equipped with a camera module such that a user can use the electronic device to take pictures. In general, the camera module includes a lens module and an image sensor module. The lens module is used to guide incident light onto the image sensor module. Hence, the quality of the lens module and/or the image sensor module would affect the image quality of the capture output of the camera module. For example, various imperfections in the lens module may create a lens shading effect. The lens shading effect may include luminance shading that causes brightness of the image center to differ from that of the image edges/corners. For an image sensor module designed to capture color images, the lens shading effect will have not only luminance shading but also color shading. Concerning the color shading, there will be a wavelength dependence of the shading such that different color components have somewhat different shading. If the image sensor module of the camera module has no built-in lens shading correction function, the inherent module variation cannot be suppressed. Even though the image sensor module of the camera module has a built-in lens shading correction function, the inherent module variation cannot be effectively suppressed due to the fact that the performance of the built-in lens shading correction function is generally poor.

Moreover, concerning the image sensor module, the sensor sensitivity of one color may be different from the sensor sensitivity of another color. Hence, a white balance correction function is required to make the captured image have correct colors. Specifically, the white balance correction is an adjustment that corrects for the color balance of the lighting so that white objects appear white, rather than colored, for example, yellow when lit by tungsten filament light or excessively blue under sunlight.

Thus, there is a need for an innovative camera correction and tuning design for avoiding/mitigating the image quality degradation resulting from imperfections of the camera module.

SUMMARY

In accordance with exemplary embodiments of the present invention, method and apparatus for tuning a camera correction setting (e.g., a lens shading correction setting or a white balance correction setting) for a camera module under a designated color temperature are proposed to solve the above-mentioned problem.

According to a first aspect of the present invention, an exemplary camera tuning circuit is disclosed. The exemplary camera tuning circuit includes a first storage space, a second storage space and a controller. The first storage space is configured to store a first reference camera correction setting for a reference camera module under a first color temperature. The second storage space is configured to store a second reference camera correction setting for the reference camera module under a second color temperature, wherein the second color temperature is different from the first color temperature. The controller is configured to receive a default camera correction setting of a target camera module, the first reference camera correction setting, and the second reference camera correction setting, and generate a tuned camera correction setting for the target camera module according to the default camera correction setting, the first reference camera correction setting, and the second reference camera correction setting.

According to a second aspect of the present invention, an exemplary camera correction method is disclosed. The exemplary camera correction method includes: performing a correction operation upon at least one camera module under only a single color temperature; and generating a default camera correction setting for each camera module according to the correction operation.

According to a third aspect of the present invention, an exemplary camera correction method is disclosed. The exemplary camera correction method includes: reading a first reference camera correction setting for a reference camera module under a first color temperature from a first storage space; reading a second reference camera correction setting for the reference camera module under a second color temperature from a second storage space, wherein the second color temperature is different from the first color temperature; and generating a tuned camera correction setting for a target camera module according to a default camera correction setting of the target camera module, the first reference camera correction setting, and the second reference camera correction setting.

According to a fourth aspect of the present invention, an exemplary camera tuning circuit is disclosed. The exemplary camera tuning circuit has a plurality of storage spaces and a controller. The storage spaces are configured to store a plurality of reference camera correction settings for different color temperatures, respectively. The controller is configured to generate a tuned camera correction setting for a camera module according to a default camera correction setting and at least a portion of the reference camera correction settings.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One concept of the present invention is to provide a co-work flow for a module house (which manufactures a camera module used in an electronic device) and an integrated circuit (IC) design house (which designs a control chip used in the electronic device). Hence, the module house may obtain a first reference camera correction setting for a reference camera module (e.g., a golden sample) under a first color temperature, and the IC design house may obtain a plurality of second reference camera correction settings for the same reference camera module under a plurality of second color temperatures different from the first color temperature. Based on the second reference camera correction settings corresponding to the second color temperatures and a default camera correction setting for a camera module under the first color temperature, a tuned camera correction setting for the camera module under any of the second color temperatures may be easily obtained. The same second reference camera correction settings may be shared by a plurality of camera modules manufactured by the module house. Hence, concerning each of the camera modules, a tuned camera correction setting for any of the second color temperatures can be obtained in the same manner. There is no need for the module house to find default camera correction settings for the same camera module under different color temperatures. Moreover, the camera correction setting may be used for lens shading correction or white balance correction. In this way, when a user uses the electronic device (e.g., a mobile phone, tablet, wearable device, laptop computer, desktop computer, etc.) with the camera module and the control chip installed therein to take pictures, a properly tuned lens shading correction (or white balance correction) may be performed by an image signal processor (ISP) of the control chip to generate shading-corrected (or white balance corrected) images with good image quality. Alternatively, the task performed by the module house for finding a default camera correction setting for each camera module under only a single color temperature and selecting a reference camera module (e.g., a golden sample) from the tested camera modules may be shifted to the IC design house. Further details of technical features of the present invention are described as below.

The IC design house may provide a correction tool to the module house, thus allowing the module house to provide correct camera correction setting information needed by the IC design house. To ensure that a camera module's correction setting provided by the module house meets the requirement, a pre-procedure may be executed. For example, the IC design house may check if the module house has the correct correction environment setup (e.g., uniform light sources each having the same color temperature); check if a sensor driver used by the module house to drive the camera module under test has a captured image orientation identical to that set by a sensor driver of a final product (e.g., a mobile phone); refer to captured test images, including a shading image captured under a light source and an optical black (OB) image captured under no light source provided by the module house, to configure correction tool's parameters such as an image size, an OB value, etc.; and confirm whether a subtraction of an OB level should be performed in the module house or the IC design house. The above is for illustrative purposes only, and is not meant to be a limitation of the present invention.

Figure 1:
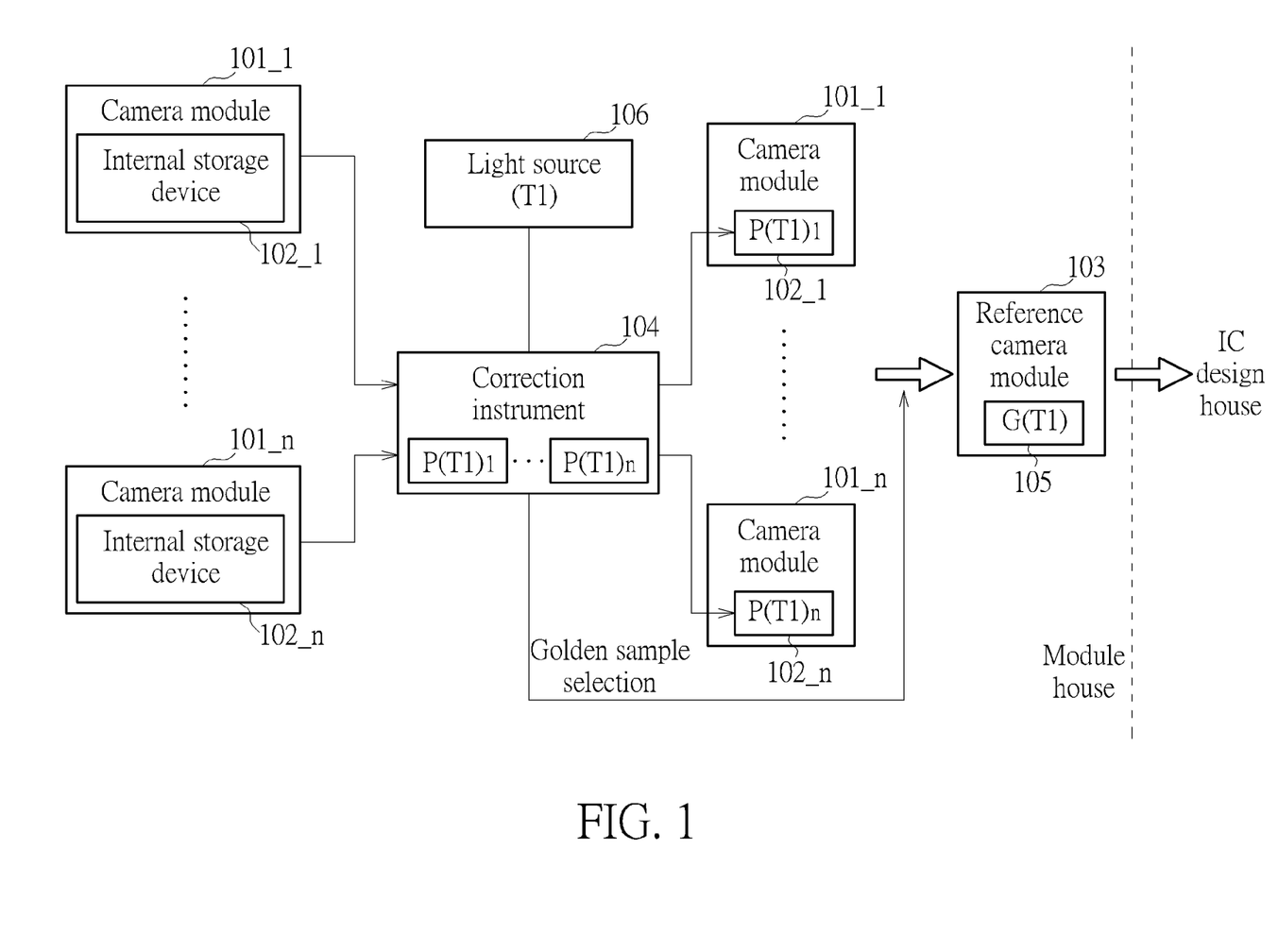
FIG. 1 is a diagram illustrating an exemplary camera correction procedure performed in a module house according to an embodiment of the present invention.

FIG. 1 is a diagram illustrating an exemplary camera correction procedure performed in a module house according to an embodiment of the present invention. After the module house manufactures a plurality of camera modules 101_1-101_n, the module house may use a light source 106 and a correction instrument 104 to perform a correction operation (e.g., a test and verification procedure) upon each of the camera modules 101_1-101_n to find a default camera correction setting for each camera module. For one example, the correction operation may be a lens shading correction operation used to find a lens shading correction setting as the default camera correction setting for each camera module. For another example, the correction operation may be a white balance correction operation used to find a white balance correction setting as the default camera correction setting for each camera module. In accordance with requirements of the flow proposed by the present invention, the light source 106 may be a uniform light source of a single color temperature T1, say, 5100K. Hence, the correction instrument 104 may be configured to perform the correction operation, such as lens shading correction or white balance correction, upon each of the camera modules 101_1-101_n under only a single color temperature. In other words, the module house does not need to obtain camera correction settings for one camera module under different color temperatures. Hence, when the correction operation is lens shading correction, only one lens shading correction setting may be obtained by the correction operation for each camera module; and when the correction operation is white balance correction, only one white balance correction setting may be obtained by the correction operation for each camera module. This can reduce the camera correction effort and cost.

Figure 2:
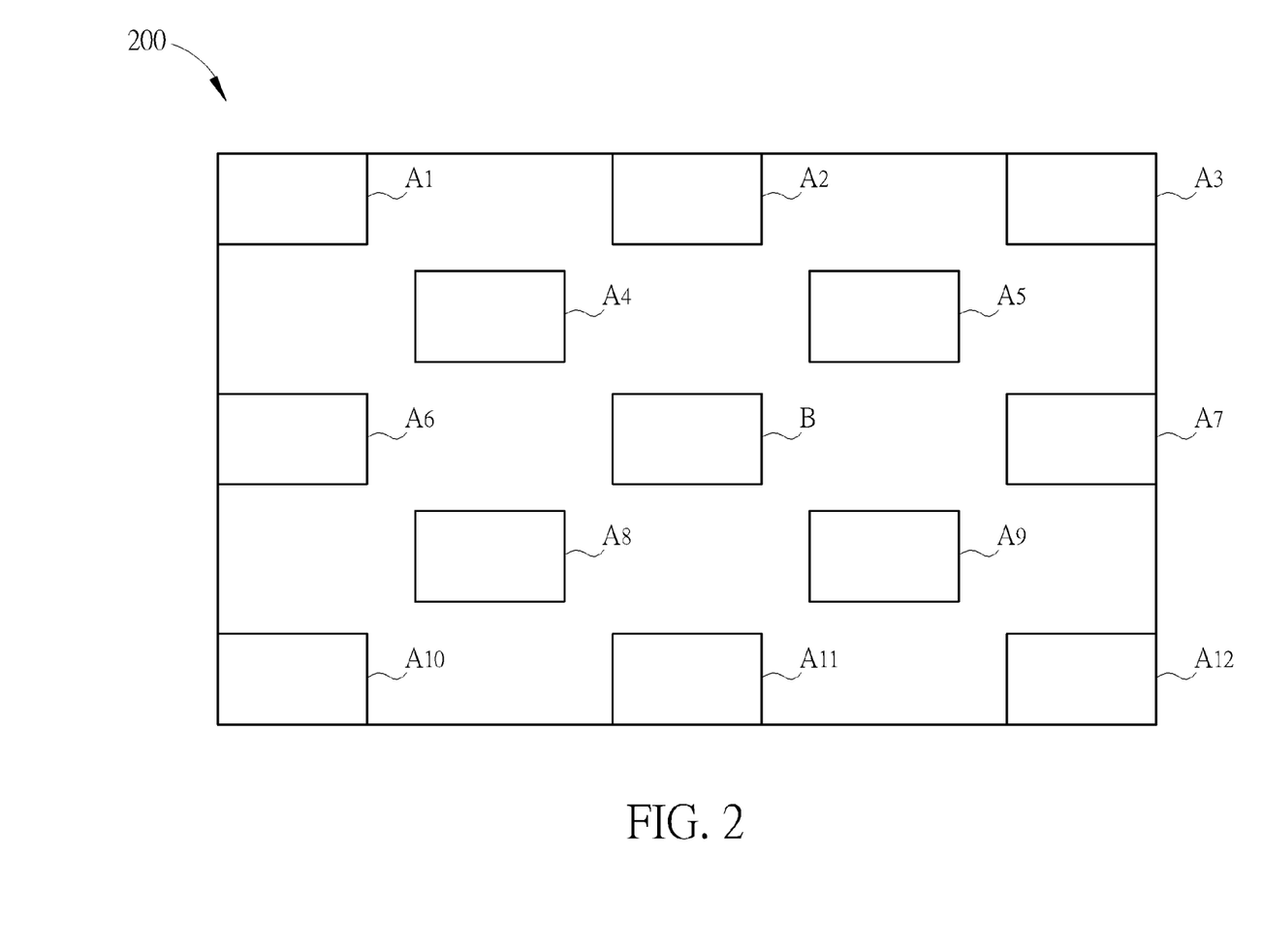
FIG. 2 is a diagram illustrating an example of a shading-corrected image generated by applying a candidate lens shading correction setting to a raw image captured by a camera module under test.

The correction instrument 104 may run the correction tool (e.g. the correction tool given by the co-working IC design house) to perform the correction operation. Hence, default camera correction settings $P(T1)_1$-$P(T1)_n$ for camera modules 101_1-101_n may be generated according to the correction operation. Taking the lens shading correction operation for example, a shading-corrected image generated by applying one candidate lens shading correction setting to a raw image captured by a camera module under test is examined by the correction instrument 104 to determine if the shading-corrected image can meet predetermined criteria. Please refer to FIG. 2, which is a diagram illustrating an example of a shading-corrected image generated by applying a candidate lens shading correction setting to a raw image captured by a camera module under test. The shading-corrected image 200 may be a color image captured by the camera module under test. Supposing that the color depth is 8 bits, the mean value of green pixel values may be 140~180 after OB subtraction. One center region B and several surrounding regions such as $A_1$-$A_{12}$ may be checked to see if the predetermined criteria is met. For example, a set of indicators for the center region B and one of the surrounding region A (A=$A_1$~$A_{12}$) may be calculated.

$$G \text{ decay} = 1 - \frac{|(G)_A - (G)_B|}{(G)_B} \quad (1)$$

$$RG \text{ color diff} = \frac{\left(\frac{R}{G}\right)_A}{\left(\frac{R}{G}\right)_B} - 1 \quad (2)$$

$$BG \text{ color diff} = \frac{\left(\frac{B}{G}\right)_A}{\left(\frac{B}{G}\right)_B} - 1 \quad (3)$$

In above equations, G represent green pixel values, R represents red pixel values, B represent blue pixel values, the suffix A represents one of the surrounding regions A1-A12, and the suffix B represents the center region B. Next, a minimum of absolute G decay values and a maximum of absolute RG color diff values and BG color diff values may be compared with threshold values such as 65% and 5%, respectively. The predetermined criteria may be expressed as below.

$$\text{Min}(|G \text{ decay}|) > 65\% \quad (4)$$

$$\text{Max}(|\text{colordiff}|) < 5\% \quad (5)$$

When the predetermined criteria are met, the candidate lens shading correction setting may be regarded as a default lens shading correction setting found for the camera module. When the predetermined criteria are not met, the candidate lens shading correction setting may be adjusted such that a new shading-corrected image may be generated for verification. Next, the predetermined criteria may be checked for the new shading-corrected image. The lens shading correction operation for finding a default camera correction setting of one camera module may not stop until a shading-corrected image can meet the predetermined criteria.

Please note that the above-mentioned verification design is for illustrative purposes only, and is not meant to be a limitation of the present invention. Any means capable of finding a default camera correction setting for each camera module under only a single color temperature may be employed. In the above embodiment, a default camera correction setting for each camera module may be found in the module house that manufactures the camera module. However, this is not meant to be a limitation of the present invention. The spirit of the present invention is obeyed as long as the correction operation is performed under only a single color temperature to find a default camera correction setting for each camera module to be used in electronic device.

In this example, after obtaining default camera correction settings $P(T1)_1$-$P(T1)_n$, the correction instrument 104 may further store the default camera correction settings $P(T1)_1$-$P(T1)_n$ into internal storage devices 102_1-102_n of the camera modules 101_1-101_n. By way of example, but not limitation, each of the internal storage devices 102_1-102_n may be a one-time programmable (OTP) memory.

Moreover, the correction instrument 104 may further check the default camera correction settings $P(T1)_1$-$P(T1)_n$ to select one of the camera modules 101_1-101_n as a reference camera module 103. Specifically, the reference camera module 103 may be a golden sample which will be supplied to the IC design house for further correction. Specifically, the module house may select one of the camera modules 101_1-101_n that has a default camera correction setting meeting a predetermined criterion to act as the reference camera module 103. For example, when the camera module 101_1 is selected as the reference camera module 103, the reference camera correction setting G(T1) stored in an internal storage device 105 is the default camera correction setting $P(T1)_1$ stored in the internal storage device 102_1 (i.e., G(T1)=$P(T1)_1$); and when the camera module 101_n is selected as the reference camera module 103, the reference camera correction setting G(T1) stored in the internal storage device 105 is the default camera correction setting $P(T1)_n$ stored in the internal storage device 102_n (i.e., G(T1)=$P(T1)_n$). Taking the lens shading correction operation for example, the predetermined criterion used by the golden sample selection may be expressed as below.

$$\text{Max}(|\text{colordiff}|) < 1.5\% \quad (6)$$

Please note that, if there is more than one camera module with a default camera correction setting meeting a predetermined criterion used by the golden sample selection, any of the qualified camera modules may be picked to serve as the reference camera module 103. In another example, if there is more than one camera module with a default camera correction setting meeting a predetermined criterion used by the golden sample selection, the one of the qualified camera modules that has lowest Max(|Color diff|) may be picked to serve as the reference camera module 103.

As shown in FIG. 1, the task of finding a default camera correction setting for each camera module under only a single color temperature and selecting a reference camera module from tested camera modules is performed by the module house. However, this is not meant to be a limitation of the present invention. Alternatively, the task performed by the module house may be shifted to the IC design house. That is, in a different arrangement, the light source 106 and the correction instrument 104 shown in FIG. 1 may be located in the IC design house. This also falls within the scope of the present invention. For clarity and simplicity, the following assumes that the above-mentioned task is performed by the module house, as illustrated in FIG. 1.

Figure 3:
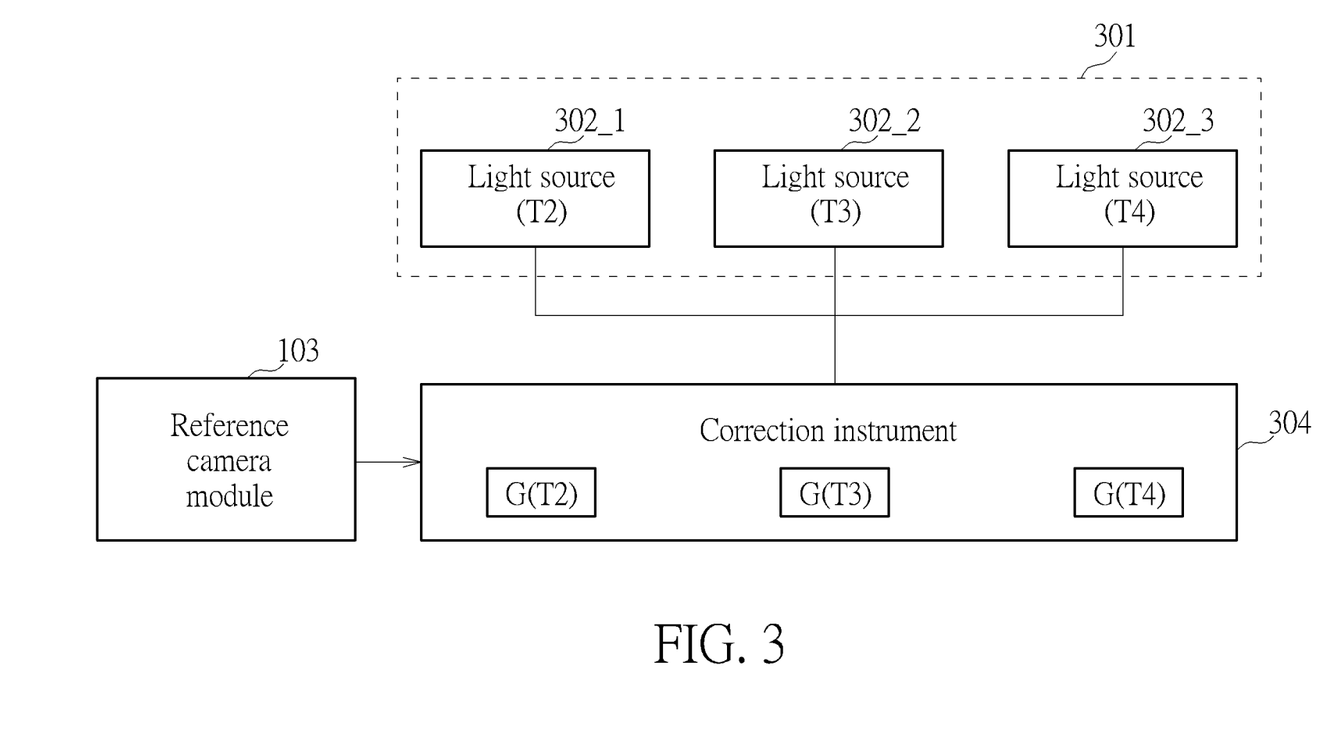
FIG. 3 is a diagram illustrating an exemplary camera correction procedure performed in an IC design house according to an embodiment of the present invention.

FIG. 3 is a diagram illustrating an exemplary camera correction procedure performed in an IC design house according to an embodiment of the present invention. After obtaining the reference camera module 103 from a provider (e.g., the module house), the IC design house may perform a correction operation upon the reference camera module 103. For example, the IC design house may design a camera tuning circuit to be used in an electronic device (e.g., a mobile phone, tablet, wearable device, laptop computer, desktop computer, etc.) to offer a tuned camera correction setting for a target camera module manufactured by the module house, and the target camera module may be one of the camera modules 101_1-101_n that is not selected as the reference camera module 103 which may be further corrected. In a case where a correction operation performed in the module house is a lens shading correction operation used to find a lens shading correction setting for a reference camera module under only a single color temperature (e.g., T1), the correction operation performed in the IC design house may be a lens shading correction operation used to find at least one lens shading correction setting for the same reference camera module under at least one different color temperature (e.g., T2). In another case where the correction operation performed in the module house is a white balance correction operation used to find a white balance correction setting for a reference camera module under only a single color temperature (e.g., T1), the correction operation performed in the IC design house may be a white balance correction operation used to find at least one white balance correction setting for the same reference camera module under at least one different color temperature (e.g., T2).

The camera tuning circuit may be customized, depending upon customer requirement. Hence, the camera correction procedure in the IC design house may be configured to generate additional reference camera correction setting(s) each meeting the customer requirement. For example, considering a case where an electronic device is designed to operate under one of three different color temperatures T2, T3 and T4 (T2≠T1, T3≠T1 and T4≠T1), a light module 301 may be required to provide uniform light outputs having different color temperatures T2, T3 and T4. In this embodiment, the light module 301 may include a plurality of light sources 302_1, 302_2, 302_3, wherein the light source 302_1 may be used to provide a uniform light output with the color temperature T2, the light source 302_2 may be used to provide a uniform light output with the color temperature T3, and the light source 302_3 may be used to provide a uniform light output with the color temperature T4.

The operation and function of the correction instrument 304 may be similar to that of the correction instrument 104. For example, when the light source 302_1 is enabled, the correction instrument 304 may perform the correction operation upon the reference camera module 103 under the color temperature T2 and generate a reference camera correction setting G(T2); when the light source 302_2 is enabled, the correction instrument 304 may perform the correction operation upon the reference camera module 103 under the color temperature T3 and generate a reference camera correction setting G(T3); and when the light source 302_3 is enabled, the correction instrument 304 may perform the correction operation upon the reference camera module 103 under the color temperature T4 and generate a reference camera correction setting G(T4).

It should be noted that the number of additional reference camera correction settings obtained by the IC design house for the reference camera module may vary according to different customer requirements. That is, generating three reference camera correction settings G(T2), G(T3) and G(T4) is for illustrative purposes only, and is not meant to be a limitation of the present invention.

Figure 4:
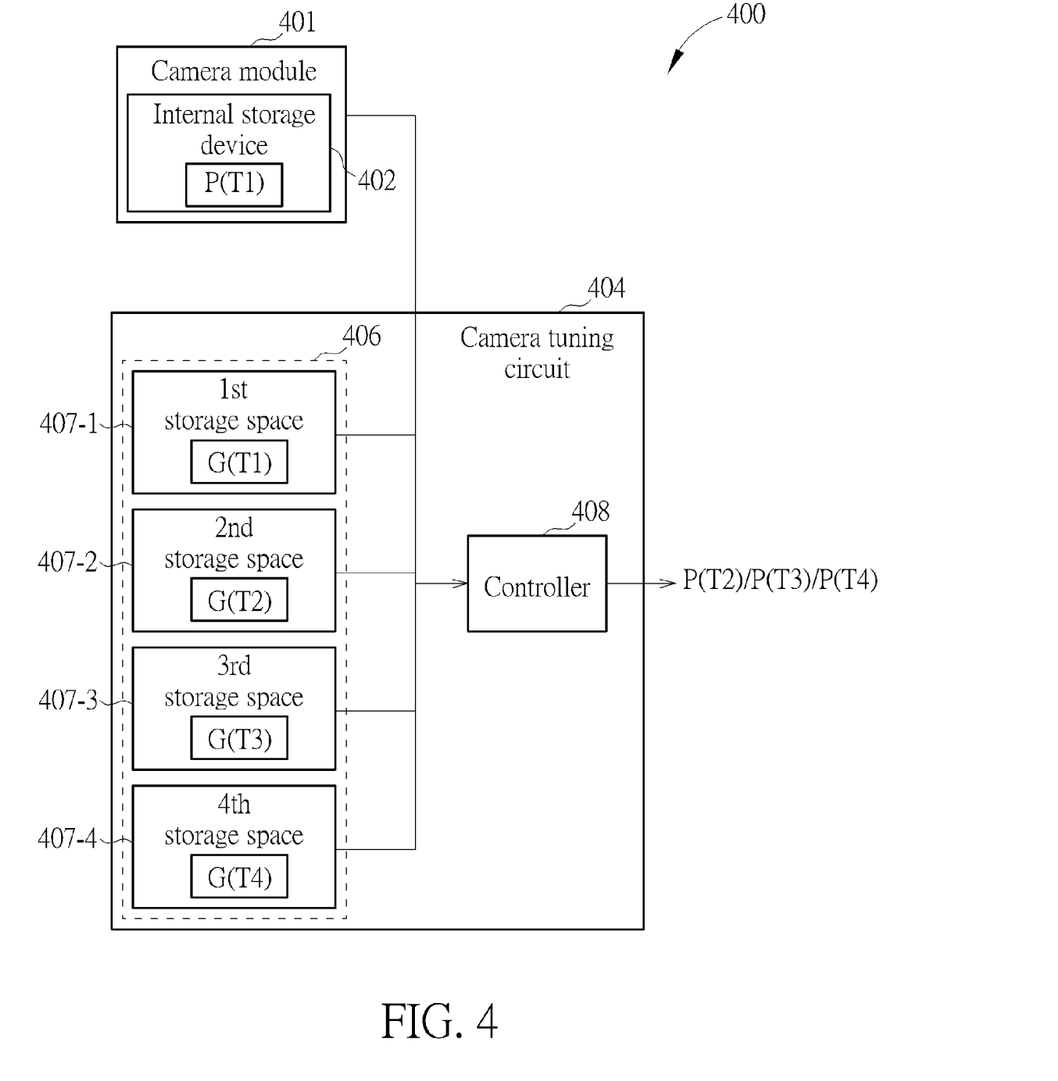
FIG. 4 is a diagram illustrating an electronic device according to an embodiment of the present invention.

FIG. 4 is a diagram illustrating an electronic device according to an embodiment of the present invention. By way of example, but not limitation, the electronic device 400 may be a mobile phone equipped with image capture functionality, such as a smart phone or a feature phone. The electronic device 400 may be any other electronic device such as a tablet, wearable device, laptop computer, desktop computer, etc. The electronic device 400 may include a camera module 401, a camera tuning circuit 404 and other circuit components (not shown). The camera module 401 may be regarded as a target camera module installed in the electronic device 400, and may be a camera module that is not the aforementioned reference camera module 103 supplied to the IC design house. Specifically, the camera module 401 may be one of the camera modules 101_1-101_n manufactured and corrected by the module house, and not selected as the reference camera module 103. Both of the camera module 401 and the camera tuning circuit 404 may be supplied to an assembly plant of the electronic device 400. As shown in FIG. 4, the camera module 401 may include an internal storage device 402 used to store a default camera correction setting P(T1) for only a single color temperature T1. For example, when the camera module 401 is the camera module 101_1, $P(T1)=P(T1)_1$; and when the camera module 401 is the camera module 101_n, $P(T1)=P(T1)_n$.

By way of example, but not limitation, the camera tuning circuit 404 may be part of an image signal processor (ISP) in a control chip of the electronic device 400. Hence, the camera tuning circuit 404 may be external to the cameral module 401, and may not be manufactured and provided by the module house. As shown in FIG. 4, the camera tuning circuit 404 may include a storage device 406 and a controller 408. For example, the storage device 406 may be an on-chip memory with a plurality of storage spaces, including a first storage space 407_1, a second storage space 407_2, a third storage space 407_3 and a fourth storage space 407_4. It should be noted that the number of storage spaces may depend on the number of reference camera correction settings. For example, the number of the storage spaces may be adjusted based on the customer requirement.

As mentioned above, the module house may provide a golden sample (i.e., reference camera module 103) to the IC design house. Hence, the reference camera correction setting G(T1) stored in the internal storage device 105 can be obtained by the IC design house. Besides, the IC design house may perform the correction operation (e.g., lens shading correction or white balance correction) upon the reference camera module 103 to obtain at least one additional reference camera correction setting such as G(T2), G(T3) and G(T4). The reference camera correction setting G(T1) may be stored into the first storage space 407_1, and the additional reference camera correction settings G(T2), G(T3) and G(T4) may be stored into the second storage space 407_2, the third storage space 407_3, and the fourth storage space 407_4, respectively.

After the electronic device 400 with the target camera module (i.e., camera module 401) and the camera tuning circuit 404 installed therein is powered on, the default camera correction setting P(T1) for one color temperature T1 and the reference camera correction settings G(T1), G(T2), G(T3), G(T4) for different color temperatures T1-T4 may be accessible to the controller 408. The controller 408 may be configured to receive the default camera correction setting P(T1) from the internal storage device 402 of the camera module 401 and the reference camera correction settings G(T1) and G(T2) from the storage device 406, and generate a tuned camera correction setting P(T2) for the camera module 401 according to the default camera correction setting P(T1) and the reference camera correction settings G(T1) and G (T2), where the tuned camera correction setting P(T2) may be a camera correction setting for the camera module 401 under the color temperature T2 that is different from the color temperature T1 used for obtaining the default camera correction setting P(T1) of the camera module 401. In one exemplary design, the controller 408 may be configured to generate the tuned camera correction setting P(T2) according an equation expressed as below.

$$P(T2) = \frac{P(T1)}{G(T1)} \times G(T2) \tag{7}$$

Similarly, the controller 408 may be configured to receive the default camera correction setting P(T1) from the internal storage device 402 of the camera module 401 and the reference camera correction settings G(T1) and G(T3) from the storage device 406, and generate another tuned camera correction setting P(T3) for the camera module 401 according to the default camera correction setting P (T1) and the reference camera correction settings G (T1) and G (T3), where the tuned camera correction setting P(T3) may be a camera correction setting for the camera module 401 under the color temperature T3 that is different from the color temperature T1 used for obtaining the default camera correction setting P(T1) of the camera module 401. In one exemplary design, the controller 408 may be configured to generate the tuned camera correction setting P(T3) according an equation expressed as below.

$$P(T3) = \frac{P(T1)}{G(T1)} \times G(T3) \qquad (8)$$

Further, the controller 408 may be configured to receive the default camera correction setting P(T1) from the internal storage device 402 of the camera module 401 and the reference camera correction settings G(T1) and G(T4) from the storage device 406, and generate yet another tuned camera correction setting P(T4) for the camera module 401 according to the default camera correction setting P(T1) and the reference camera correction settings G(T1) and G(T4), where the tuned camera correction setting P(T4) may be a camera correction setting for the camera module 401 under the color temperature T4 that is different from the color temperature T1 used for obtaining the default camera correction setting P(T1) of the camera module 401. In one exemplary design, the controller 408 may be configured to generate the tuned camera correction setting P(T4) according an equation expressed as below.

$$P(T4) = \frac{P(T1)}{G(T1)} \times G(T4) \qquad (9)$$

It should be noted that the above equations (7)-(9) are for illustrative purposes only. Any computational algorithm using a default camera correction setting for only a single color temperature and at least a portion of reference camera correction settings for different color temperatures to generate a tuned camera correction setting for one designated color temperature different from the single color temperature falls within the scope of the present invention.

In summary, the present invention proposes a co-work flow for improving camera correction performance of an electronic device by a module house collaborating with an IC design house. Hence, the module house may obtain a first reference camera correction setting for a reference camera module (e.g., a golden sample) under a first color temperature, and the IC design house may obtain a plurality of second reference camera correction settings for the same reference camera module under a plurality of second color temperatures different from the first color temperature. Based on the second reference camera correction settings corresponding to the second color temperatures and a default camera correction setting for a camera module under the first color temperature, a tuned camera correction setting for the camera module under any of the second color temperatures may be easily obtained. The same second reference camera correction settings may be shared by a plurality of camera modules manufactured by the module house. Hence, concerning each of the camera modules, a tuned camera correction setting for any of the second color temperatures can be obtained in the same manner. There is no need for the module house to find default camera correction settings for the same camera module under different color temperatures. Alternatively, the task performed by the module house for finding a default camera correction setting for each camera module under only a single color temperature and selecting a reference camera module (e.g., a golden sample) from the tested camera modules may be shifted to the IC design house.

For example, the module house may correct the module variation of each camera module under only a first color temperature. Hence, a camera correction setting determined in the module house is able to make the module variation under the first color temperature fall within an acceptable range such as −5%~+5%. Since the electronic device using a target camera module may be operated under a second color temperature different from the first color temperature, the default camera correction setting provided by the module house may not be the optimum camera correction setting for the second color temperature. In accordance with the present invention, the camera tuning circuit provided by the IC design house may store at least a first reference camera correction setting for a reference camera module under the first color temperature and a second reference camera correction setting for the reference camera module under the second color temperature, where the reference camera module may be selected from camera modules manufactured and corrected by the module house, and the second reference camera correction setting may be obtained by applying a correction operation to the reference camera module obtained by the IC design house from the module house. Based on the default camera correction setting of the target camera module (which may be installed in the electronic device) and the first and second reference camera correction settings of the reference camera module (which may not be installed in the electronic device), a tuned camera correction setting for the target camera module under the second color temperature can be calculated.

In accordance with the conventional design, the module variation cannot be suppressed when an image sensor module of the camera module has no built-in lens shading correction function. However, in accordance with the present invention, the proposed camera tuning circuit can provide a suitable camera correction setting that is capable of effectively suppressing the module variation. Further, in accordance with the conventional design, it is possible that the image sensor module of the camera module may be equipped with a built-in lens shading correction function. However, when the shading correction performance of the built-in lens shading correction function is not good enough, the module variation cannot be effectively suppressed. In accordance with the present invention, when the shading correction performance of the built-in lens shading correction function of the image sensor module is poor, the built-in lens shading correction function of the image sensor module may be disabled, and the proposed camera tuning circuit can be enabled to provide a suitable camera correction setting that is capable of effectively suppressing the module variation. To put is simply, the proposed camera correction design may be applicable to any electronic device using a camera module with/without a built-in lens shading correction function.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A camera tuning circuit, comprising:
   a first storage space, configured to store a first reference camera correction setting for a reference camera module under a first color temperature;
   a second storage space, configured to store a second reference camera correction setting for the reference camera module under a second color temperature, wherein the second color temperature is different from the first color temperature; and
   a controller, configured to receive a default camera correction setting of a target camera module, the first reference camera correction setting, and the second reference camera correction setting, and generate a tuned camera correction setting for the target camera module according to the default camera correction setting, the first reference camera correction setting, and the second reference camera correction setting.

2. The camera tuning circuit of claim 1, wherein the controller obtains the default camera correction setting from an internal storage device of the target camera module.

3. The camera tuning circuit of claim 1, wherein the camera tuning circuit is external to the target camera module.

4. The camera tuning circuit of claim 1, wherein the default camera correction setting is a camera correction setting for the target camera module under the first color temperature, and the tuned camera correction setting is a camera correction setting for the target camera module under the second color temperature.

5. The camera tuning circuit of claim 1, wherein the controller is configured to generate the tuned camera correction setting according an equation expressed as below:

$$P(T2) = \frac{P(T1)}{G(T1)} \times G(T2),$$

where P(T2) represents the tuned camera correction setting, P(T1) represents the default camera correction setting, G(T1) represents the first reference camera correction setting, and G(T2) represents the second reference camera correction setting.

6. The camera tuning circuit of claim 1, wherein each of the tuned camera correction setting, the default camera correction setting, the first reference camera correction setting and the second reference camera correction setting is a lens shading correction setting.

7. The camera tuning circuit of claim 1, wherein each of the tuned camera correction setting, the default camera correction setting, the first reference camera correction setting and the second reference camera correction setting is a white balance correction setting.

8. A camera correction method, comprising:
   performing a correction operation upon at least one camera module under only a single color temperature; and
   generating a default camera correction setting for each camera module according to the correction operation,
   wherein the correction operation is performed upon each of a plurality of camera modules, and the camera correction method further comprises:
   selecting one of the camera modules that has a default camera correction setting meeting a predetermined criterion to act as a reference camera module.

9. The camera correction method of claim 8, wherein the camera correction method is performed in a module house that manufactures the at least one camera module.

10. The camera correction method of claim 8, further comprising:
    storing the default camera correction setting of each camera module into an internal storage device of the camera module.

11. The camera correction method of claim 8, wherein the correction operation is a lens shading correction operation.

12. The camera correction method of claim 8, wherein the correction operation is a white balance correction operation.

13. A camera correction method, comprising:
    reading a first reference camera correction setting for a reference camera module under a first color temperature from a first storage space;
    reading a second reference camera correction setting for the reference camera module under a second color temperature from a second storage space, wherein the second color temperature is different from the first color temperature; and
    generating a tuned camera correction setting for a target camera module according to a default camera correction setting of the target camera module, the first reference camera correction setting, and the second reference camera correction setting.

14. The camera correction method of claim 13, further comprising:
    reading the default camera correction setting corresponding to the first color temperature from an internal storage device of the target camera module.

15. The camera correction method of claim 13, wherein each of the tuned camera correction setting, the default camera correction setting, the first reference camera correction setting and the second reference camera correction setting is a lens shading correction setting.

16. The camera correction method of claim 13, wherein each of the tuned camera correction setting, the default camera correction setting, the first reference camera correction setting and the second reference camera correction setting is a white balance correction setting.

* * * * *